(12) United States Patent
Carter et al.

(10) Patent No.: US 8,271,888 B2
(45) Date of Patent: Sep. 18, 2012

(54) THREE-DIMENSIONAL VIRTUAL WORLD ACCESSIBLE FOR THE BLIND

(75) Inventors: William S. Carter, Round Rock, TX (US); Guido D. Corona, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 599 days.

(21) Appl. No.: 12/358,838

(22) Filed: Jan. 23, 2009

(65) Prior Publication Data
US 2010/0192110 A1 Jul. 29, 2010

(51) Int. Cl.
*G06F 3/048* (2006.01)

(52) U.S. Cl. ........ 715/757; 715/706; 715/865; 345/419; 345/427; 345/473; 345/474

(58) Field of Classification Search .................. 715/757, 715/706, 865; 345/419, 427, 473, 474
See application file for complete search history.

(56) References Cited

U.S. PATENT DOCUMENTS

| | | | | | |
|---|---|---|---|---|---|
| 4,322,744 | A | * | 3/1982 | Stanton | 348/62 |
| 5,305,429 | A | * | 4/1994 | Sato et al. | 345/419 |
| 5,737,505 | A | * | 4/1998 | Shaw et al. | 345/419 |
| 5,883,628 | A | * | 3/1999 | Mullaly et al. | 715/850 |
| 5,926,179 | A | * | 7/1999 | Matsuda et al. | 715/752 |
| 5,956,038 | A | * | 9/1999 | Rekimoto | 345/419 |
| 6,023,270 | A | * | 2/2000 | Brush et al. | 715/741 |
| 6,049,341 | A | * | 4/2000 | Mitchell et al. | 345/473 |
| 6,091,410 | A | * | 7/2000 | Lection et al. | 715/706 |
| 6,144,381 | A | * | 11/2000 | Lection et al. | 715/850 |
| 6,166,732 | A | * | 12/2000 | Mitchell et al. | 715/733 |
| 6,219,045 | B1 | * | 4/2001 | Leahy et al. | 715/757 |
| 6,229,533 | B1 | * | 5/2001 | Farmer et al. | 345/473 |
| 6,256,043 | B1 | * | 7/2001 | Aho et al. | 345/629 |
| 6,292,198 | B1 | * | 9/2001 | Matsuda et al. | 345/473 |
| 6,331,853 | B1 | * | 12/2001 | Miyashita | 345/427 |
| 6,366,285 | B1 | * | 4/2002 | Brush et al. | 345/473 |
| 6,476,830 | B1 | * | 11/2002 | Farmer et al. | 715/769 |
| 6,961,439 | B2 | * | 11/2005 | Ballas | 381/309 |
| 6,961,458 | B2 | * | 11/2005 | Dutta et al. | 382/154 |
| 7,155,680 | B2 | * | 12/2006 | Akazawa et al. | 715/757 |
| 7,755,744 | B1 | * | 7/2010 | Leberer | 356/5.1 |
| 7,843,471 | B2 | * | 11/2010 | Doan et al. | 345/633 |
| 2002/0113809 | A1 | * | 8/2002 | Akazawa et al. | 345/706 |
| 2003/0007648 | A1 | * | 1/2003 | Currell | 381/61 |
| 2003/0128205 | A1 | * | 7/2003 | Varghese | 345/419 |
| 2004/0239617 | A1 | * | 12/2004 | Hardwick | 345/156 |
| 2004/0241623 | A1 | * | 12/2004 | Lenay et al. | 434/112 |

(Continued)

*Primary Examiner* — Doon Chow
*Assistant Examiner* — David Choi
(74) *Attorney, Agent, or Firm* — Yudell Isidore Ng Russell, PLLC

(57) ABSTRACT

A method, a system, and a computer program product for providing a virtual probe, associated with an avatar, which enables blind or sightless navigation of an avatar through a virtual world. The system outputs tactile information and/or audible information that depict the presence of an object in the virtual world, in association with the avatar. When the virtual probe encounters an object in the virtual world the distance between the object and the avatar, a velocity of the object, and the dimensions of the object are determined. The tactile information, such as one or more vibrations, is output proportional to the distance between the object and the avatar and/or the dimension of the object. Audible information is also output in response to the detection of the object. Audible information, such as an audible voice, outputs one or more of the distance between the object and the avatar, the velocity of the object, and the dimensions of the object.

3 Claims, 5 Drawing Sheets

U.S. PATENT DOCUMENTS

| | | | |
|---|---|---|---|
| 2005/0069143 A1* | 3/2005 | Budnikov et al. | 381/63 |
| 2006/0024647 A1* | 2/2006 | Chesnais et al. | 434/114 |
| 2006/0119572 A1* | 6/2006 | Lanier | 345/156 |
| 2006/0293839 A1* | 12/2006 | Stankieiwcz et al. | 701/200 |
| 2007/0130212 A1* | 6/2007 | Peurach et al. | 707/104.1 |
| 2007/0211047 A1* | 9/2007 | Doan et al. | 345/419 |
| 2007/0252832 A1* | 11/2007 | Ratai | 345/427 |
| 2008/0172635 A1* | 7/2008 | Ross et al. | 715/826 |
| 2008/0198222 A1* | 8/2008 | Gowda | 348/62 |
| 2008/0215975 A1* | 9/2008 | Harrison et al. | 715/706 |
| 2009/0051681 A1* | 2/2009 | Sharp et al. | 345/419 |
| 2009/0132931 A1* | 5/2009 | Tatsubori | 715/752 |
| 2009/0147003 A1* | 6/2009 | Do et al. | 345/427 |
| 2009/0150802 A1* | 6/2009 | Do et al. | 715/757 |
| 2009/0158151 A1* | 6/2009 | Cheng et al. | 715/706 |
| 2009/0204907 A1* | 8/2009 | Finn et al. | 715/757 |
| 2009/0237403 A1* | 9/2009 | Horii et al. | 345/427 |
| 2009/0241036 A1* | 9/2009 | Reisinger | 715/757 |
| 2009/0249227 A1* | 10/2009 | Clark et al. | 715/757 |
| 2009/0286605 A1* | 11/2009 | Hamilton et al. | 463/42 |
| 2010/0001993 A1* | 1/2010 | Finn et al. | 345/419 |
| 2010/0011312 A1* | 1/2010 | Banerjee et al. | 715/772 |
| 2010/0020100 A1* | 1/2010 | Dolbier et al. | 345/634 |
| 2010/0098274 A1* | 4/2010 | Hannemann et al. | 381/300 |
| 2010/0125799 A1* | 5/2010 | Roberts et al. | 715/757 |
| 2010/0169799 A1* | 7/2010 | Hyndman et al. | 715/757 |
| 2010/0192110 A1* | 7/2010 | Carter et al. | 715/865 |
| 2010/0269053 A1* | 10/2010 | Lingafelt et al. | 715/757 |

* cited by examiner

THREE-DIMENSIONAL VIRTUAL WORLD ACCESSIBLE FOR THE BLIND

BACKGROUND

1. Technical Field

The present invention generally relates to computer systems and in particular to virtual world applications within computer systems.

2. Description of the Related Art

The content of a 3-dimensional virtual world (such as the Second Life online computer application) is almost entirely visual. While there are some auditory cues, operating in a 3-dimensional virtual world environment is generally impossible for a blind or vision-impaired person. Virtual worlds are typically implemented in such a way as to simulate a visual 3-dimensional paradigm which is easily grasped by the sighted majority of users. The challenge for the blind user is to create a mental image which is congruent with the visual paradigm of the virtual space.

SUMMARY OF ILLUSTRATIVE EMBODIMENTS

Disclosed are a method, a system, and a computer program product for providing a virtual probe that enables blind or sightless navigation of an avatar through a virtual world. The virtual probe is associated with the avatar. The system outputs tactile information and/or audible information that depict the presence of an object in the virtual world. One or more dimensions for a virtual probe are received that determine a probing range of the virtual probe. When the virtual probe detects an object in the virtual world, the distance between the object and the avatar, relative location of the object, a velocity of the object, and the dimensions of the object are determined. The system outputs tactile information in response to the detection of the object. The tactile information, such as one or more vibrations, is output proportional to the distance between the object and the avatar, the relative location of the object, and/or the dimension of the object. Audible information is also output in response to the detection of the object. Audible information, such as an audible voice, outputs one or more of the distance between the object and the avatar, the relative location of the object, the velocity of the object, and the dimensions of the object.

The above as well as additional objectives, features, and advantages of the present invention will become apparent in the following detailed written description.

BRIEF DESCRIPTION OF THE DRAWINGS

The invention itself, as well as advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

Figure 1:
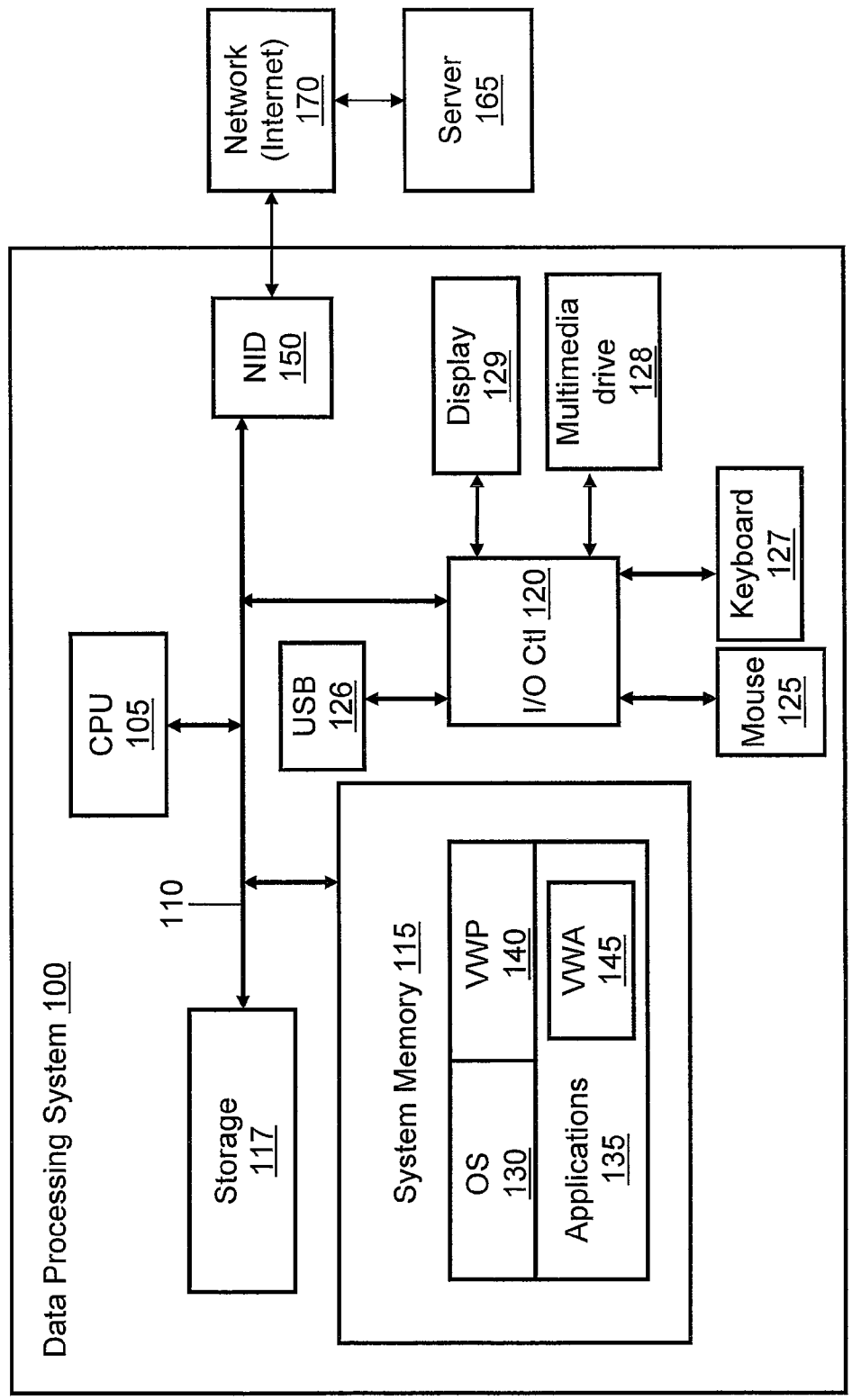
FIG. 1 is a block diagram of a data processing system, within which various features of the invention may advantageously be implemented, according to one embodiment of the invention.

The illustrative embodiments provide a method, a system, and a computer program product for providing a virtual probe that enables blind or sightless navigation of an avatar through a virtual world. The virtual probe is associated with the avatar. The system outputs tactile information and/or audible information that depict the presence of an object in the virtual world. One or more dimensions for a virtual probe are received that determine a probing range of the virtual probe. When the virtual probe detects an object in the virtual world, the distance between the object and the avatar, relative location of the object, a velocity of the object, and the dimensions of the object are determined. The system outputs tactile information in response to the detection of the object. The tactile information, such as one or more vibrations, is output proportional to the distance between the object and the avatar, the relative location of the object, and/or the dimension of the object. Audible information is also output in response to the detection of the object. Audible information, such as an audible voice, outputs one or more of the distance between the object and the avatar, the relative location of the object, the velocity of the object, and the dimensions of the object.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

Within the descriptions of the figures, similar elements are provided similar names and reference numerals as those of the previous figure(s). Where a later figure utilizes the element in a different context or with different functionality, the element is provided a different leading numeral representative of the figure number. The specific numerals assigned to the elements are provided solely to aid in the description and not meant to imply any limitations (structural or functional or otherwise) on the described embodiment.

It is understood that the use of specific component, device and/or parameter names (such as those of the executing utility/logic described herein) are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that term is utilized.

With reference now to the figures, and beginning with FIG. 1, there is depicted a block diagram representation of an example data processing system (DPS), as utilized within one embodiment. DPS may be a computer, a portable device, such as a personal digital assistant (PDA), a smart phone, and/or other types of electronic devices that may generally be considered processing devices. As illustrated, DPS 100 comprises at least one processor or central processing unit (CPU) 105 connected to system memory 115 via system interconnect/bus 110. Also connected to system bus 110 is input/output (I/O) controller 120, which provides connectivity and control for input devices, of which pointing device (or mouse) 125 and keyboard 127 are illustrated. I/O controller 120 also provides connectivity and control for output devices, of which display 129 is illustrated. Additionally, a multimedia drive 128 (e.g., compact disk read/write (CDRW) or digital video disk (DVD) drive) and USB (universal serial bus) port 126 are illustrated, coupled to I/O controller 120. Multimedia drive 128 and USB port 126 enable insertion of a removable storage device (e.g., optical disk or thumb drive) on which data/instructions/code may be stored and/or from which data/instructions/code may be retrieved. DPS 100 also comprises storage 117, within/from which data/instructions/code may also be stored and/or retrieved.

DPS 100 is also illustrated with a network interface device (NID) 150, by which DPS 100 may connect to one or more access/external networks 170, of which the Internet is provided as one example. In this implementation, the Internet represents/is a worldwide collection of networks and gateways that utilize the Transmission Control Protocol/Internet Protocol (TCP/IP) suite of protocols to communicate with one another. NID 150 may be configured to operate via wired and/or wireless connection to an access point of the network. Network 170 may be an external network such as the Internet or wide area network (WAN), or an internal network such as an Ethernet (local area network—LAN) or a Virtual Private Network (VPN). Connection to the external network 170 may be established with one or more servers 165, which may also provide data/instructions/code for execution on DPS 100, in one embodiment.

In addition to the above described hardware components of DPS 100, various features of the invention are completed/supported via software (or firmware) code or logic stored within system memory 115 or other storage (e.g., storage 117) and executed by CPU 105. Thus, for example, illustrated within system memory 115 are a number of software/firmware/logic components, including operating system (OS) 130 (e.g., Microsoft Windows®, a trademark of Microsoft Corp, or GNU®/Linux®, registered trademarks of the Free Software Foundation and The Linux Mark Institute), applications 135, and virtual world probe (VWP) utility 140 (which executes on CPU 105 to provide virtual world probe logic). In actual implementation, VWP utility 140 may be combined with or incorporated within applications 135 (and VWA 145) to provide a single executable component, collectively providing the various functions of each individual software component when the corresponding combined code is executed by the CPU 105. For simplicity, VWP utility 140 is illustrated and described as a stand alone or separate software/firmware component, which provides specific functions, as described below.

In one embodiment, servers 165 includes a software deploying server, and DPS 100 communicates with the software deploying server (165) via network (e.g., Internet 170) using network interface device 150. Then, the VWP utility 140 may be deployed from/on the network, via software deploying server 165. With this configuration, software deploying server performs all of the functions associated with the execution of VWP utility 140. Accordingly, DPS 100 is not required to utilize internal computing resources of DPS 100 to execute VWP utility 140.

In one embodiment, VWP utility 140 may be deployed without a network. For instance a handheld computing device executes VWP utility 140 independent of a server and/or network. VWA 145 and associated application (135) utilize one or more functions of the VWP utility, or the VWP utility execute as a stand alone or separate software/firmware component.

CPU 105 executes VWP utility 140 as well as OS 130, which supports the user interface features of VWP utility 140. In the described embodiment, VWP utility 140 generates/provides several graphical user interfaces (GUI) to enable user interaction with, or manipulation of, the functional features of VWP utility 140. Certain functions supported and/or implemented by VWP utility generate processing logic executed by processor and/or device hardware to complete the implementation of that function. For simplicity of the description, the collective body of code that enables these various features is referred to herein as VWP utility 140. Among the software code/instructions/logic provided by VWP utility 140, and which are specific to the invention, are: (a) code/logic for generating a virtual probe when a request is received to initiate use of the virtual probe; (b) code/logic for associating the virtual probe with an avatar; and (c) code/logic for enabling sightless navigation of an avatar through a virtual world by outputting tactile information and/or audible information depicting the presence of an object. According to the illustrative embodiment, when CPU 105 executes VWP utility 140, DPS 100 initiates a series of functional processes that enable the above functional features as well as additional features/functionality. These features/functionality are described in greater detail below within the description of FIGS. 2-5.

Those of ordinary skill in the art will appreciate that the hardware components and basic configuration depicted in FIG. 1 may vary. The illustrative components within DPS 100 are not intended to be exhaustive, but rather are representative to highlight essential components that are utilized to implement the present invention. For example, other devices/components may be used in addition to or in place of the hardware depicted. The depicted example is not meant to imply architectural or other limitations with respect to the presently described embodiments and/or the general invention. The data processing system depicted in FIG. 1 may be, for example, an IBM eServer pSeries system, a product of International Business Machines Corporation in Armonk, N.Y., running the Advanced Interactive Executive (AIX) operating system or LINUX operating system.

Figure 2:
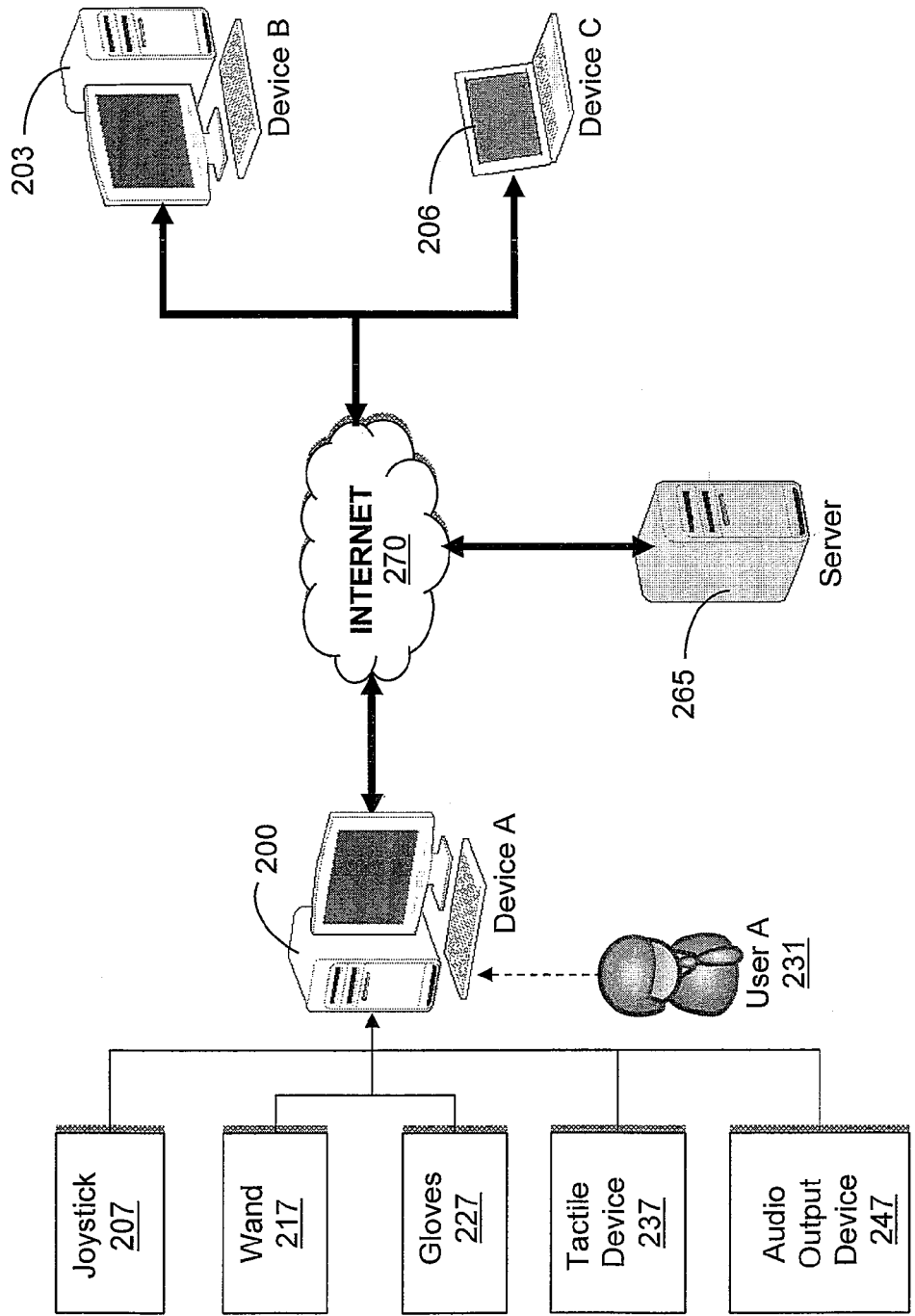
FIG. 2 illustrates an example network of devices communicating via the Internet, in accordance with one embodiment of the invention.

With reference now to FIG. 2, there is depicted one or more devices of network 220 communicating via the Internet. Network 220 comprises device A 200, device B 203, and device 206 which communicate with server 265 via Internet 270. Connected to device A are joystick 207, wand 217, gloves 227, tactile device 237, and audio output device 247. User A 231 operates on device A 200. User A 231 may or may not have sight deficiencies.

In one embodiment, one or more users communicate in a virtual world environment. Operators of one or more computer devices are presented as "avatars" in the virtual world environment. Operators of device A 200 (similar to DPS 100 in FIG. 1), device B 203, and device 206 communicate in the virtual world (environment) via Internet 270, whereby server 265 executes the virtual world application. User A 231 operates as a blind and/or visually impaired user on device A 200, and maneuvers an avatar through the virtual world (whereby the avatar may and/or may not have sight deficiency).

In one embodiment, a tactile device outputs tactile information when an avatar nears and/or detects an object in the virtual world. For example, user A 231 touches and/or connects to a tactile device, such as tactile device 237. The avatar, controlled by user A 231, nears and/or encounters an object within the virtual world. Tactile device 237 outputs a shift (which is physically experience by user A) that depicts the distance between the avatar and the object, and/or an encounter with the object. The tactile information provided by tactile device 237 is provided in real time, and enables user A 231 to manipulate real time movement through the virtual world.

In another embodiment, an audio output device outputs an audible message when the avatar nears and/or encounters an object in the virtual world. For example, user A 231 nears and/or encounters an object within the virtual world. A virtual probe associated with the avatar detects the distance, dimensions, relative location and/or movement of objects within the avatar's path. The detected information is outputted in an audible statement via audio output device 247.

In one embodiment, tactile information is provided by one or more of a joystick (207), wand (217), and gloves (227). User 231 may utilize wand 217 to analyze an object within the avatar's (virtual) path. When the avatar nears or encounters an object within the virtual world, joystick 207, wand 217, and/or gloves 227 respond with movement and/or vibration depicting the presence the object. In one embodiment, the movement of joystick 207, wand 217, and/or gloves 227 indicates the distance between the avatar and the object.

Figure 3:
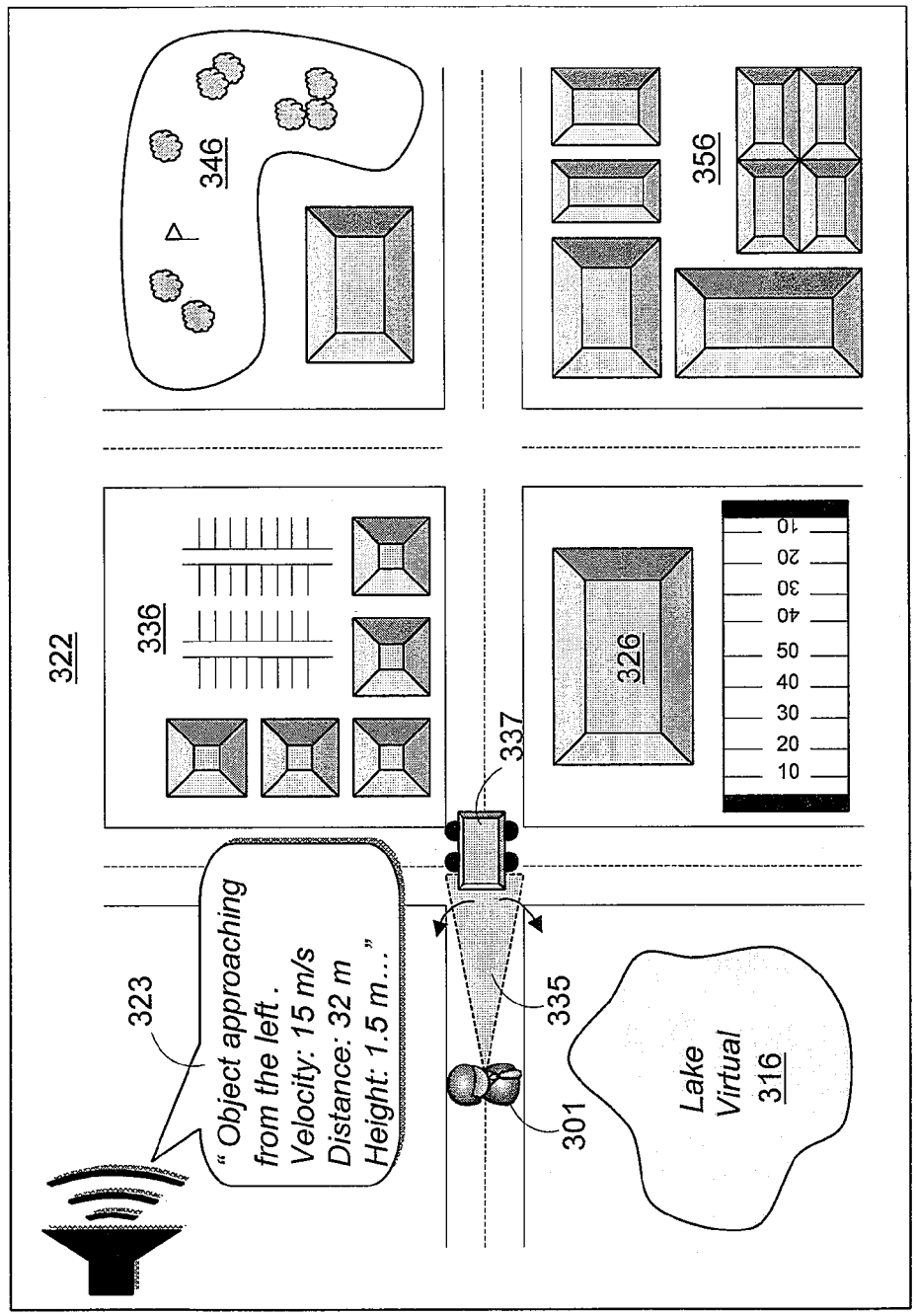
FIG. 3 is a block diagram depicting the interaction of a virtual probe with an object in a virtual world atmosphere, according to one embodiment of the invention.

FIG. 3 illustrates operations of a virtual probe in a virtual world environment. Virtual world environment 322 comprises avatar 301, virtual probe 335, and object 337. One or more stationary objects and/or locations are also depicted in virtual world environment 332, such as: lake 316, recreation site 326, shopping center 336, golf course 346, and business park 356. Audible information 323 depicts audible information output when an object is detected.

In one embodiment, virtual probe 335 enables sightless navigation of an avatar through virtual world environment 332 by outputting one or more of tactile information and audible information depicting the presence of an object. Virtual probe 335 is associated with avatar 301. Virtual probe 335 is positioned in front of avatar 301, and precedes a head of avatar 301 when avatar 301 is in motion. The movement of virtual probe 335 is directly associated with the movement of avatar 301. When avatar 301 turns left, right, up, down, forward, or backward, virtual probe 335 scans an area determined by the axial length, horizontal dispersion angle, and vertical dispersion angle of virtual probe 335. When virtual probe 335 detects object 337 (regardless of whether object is moving or stationary), one or more of a distance between the object and the avatar, a velocity of the object, a relative location of the object, and a dimension of the object are determined.

In one embodiment, one or more of the tactile information and the audible information are output to the user (201 of FIG. 2) of an avatar when the virtual probe detects an object (337), in real time. The tactile and/or audible information (323) outputs the distance between object (335) and avatar 301, the velocity of object 335, the relative location of object 335, and/or the dimension of object 335 as the information is detected by virtual probe 335. The dimensions (e.g. size, shape, length) of virtual probe 335 is adjusted in real-time and/or in predetermined settings. For example adjusting the dimensions of virtual probe 335 provide a narrow wand or a thick cone, as well as major and minor variations of the narrow wand and the thick cone.

In another embodiment, the virtual probe is a "phantom probe", whereby virtual probe 335 passes freely through object 337 when the virtual probe intersects the object. As the intersected volume of object 337 increases and decreases audible information 323 and/or vibratory feedback is outputted. The output of the audible information 323, frequency of the audible information, and/or vibratory feedback is directly proportional to the intersected volume. Passing virtual probe 335 through object 337, from one or more angles and/or directions, enables the shape and size of object 337, a velocity of the object, a relative location of the object, and a dimension of the object to be determined. The frequency of the audible information and/or intensity of the vibration includes but is not limited to modification of tone characteristics such as tone frequency, timbre, tone envelope, and frequency of tone repetitions corresponding to the increase and decrease in the volume of space intersected by both the object and the probe.

In one embodiment, the tactile information provided to a user outputs a response that is directly associated with the virtual probe. The tactile information outputs a signal, such as a vibration, when virtual probe 335 encounters object 337. When the tactile information is a vibration, a frequency and/or an intensity of the vibration is associated with the distance between object 337 and avatar 307. As the distance between object 337 and avatar 301 decreases, one or more of the frequency and intensity of the vibration increases. The frequency and intensity of the vibration decreases as the distance between the object and the avatar increases.

In one embodiment, the audible information is an audible voice and/or an audible tone. When audible information 323 is an audible voice, one or more of the distance between object 337 and avatar 301, the velocity of object 337, and the dimensions of object 337 are output in audible information 323. When audible information 323 is a tone, a sound proportional to one or more of the distance between object 337 and avatar 301 and the dimensions of object 337 are output. The tone provided by audible information 323 is one or more of a single tone and a series of tones. When the distance between object 337 and avatar 301 decreases, one or more of a pitch, a tone frequency, and a frequency of tone outputs increases. When the distance between object 337 and avatar 301 decreases, one or more of the pitch, the tone frequency, and the frequency of tone outputs decrease.

Figure 4:
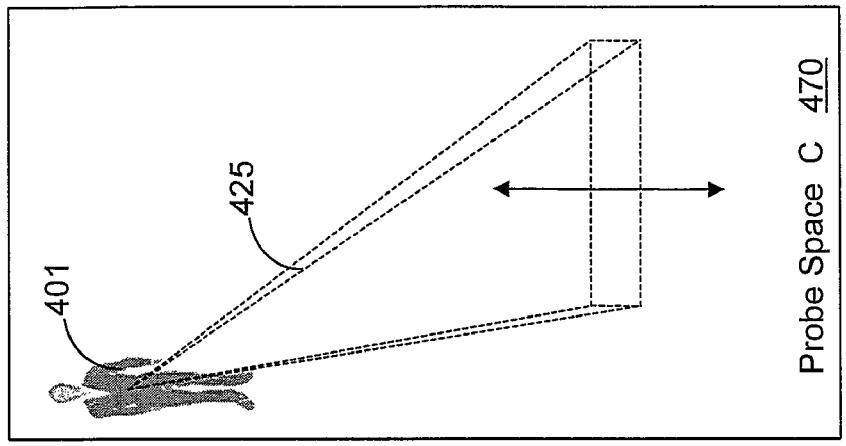
FIG. 4 is a schematic diagram illustrating spatial operations of a virtual world probe, in accordance with one embodiment of the invention.
Figure 4:
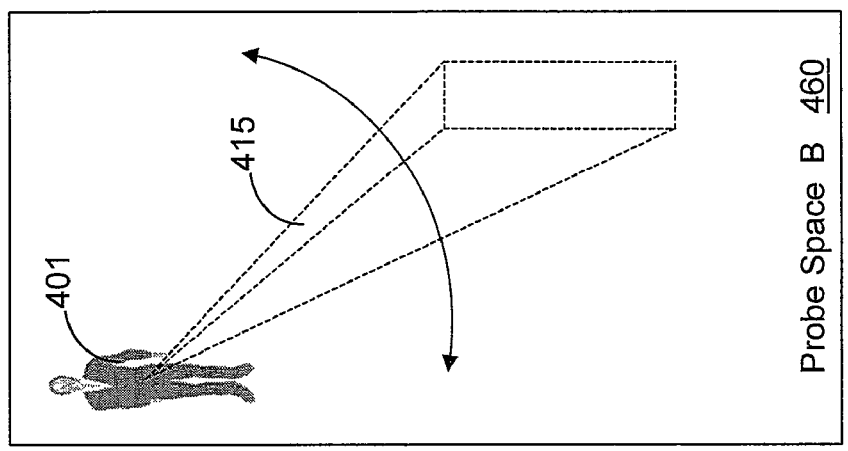
Figure 4:
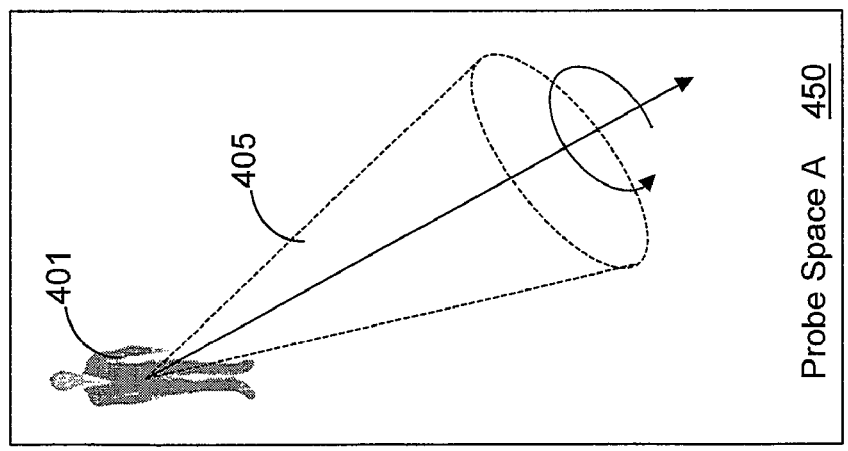

FIG. 4 illustrates one or more operations of a virtual probe. FIG. 4 includes probe space A 450, probe space B 460, and probe space C 470. Within probe space A 450 are avatar 401 and conical probe space 405. Avatar 401 and vertical probe space 415 are depicted in probe space 460. Within probe space C 470 are avatar 401 and horizontal probe space 470.

In one embodiment, a conical probe space, a vertical probe space, and/or a horizontal probe space is associated with an avatar. One or more of a conical probe space 405, vertical probe space 415, and horizontal probe space 425 operate in association with avatar 401 to detect one or more objects that are near and/or touching avatar 401. VWP utility (140) receives one or more dimensions from a user (or default dimensions) to determine the axial length of the virtual probe. Virtual probe angle inputs are also received from the user (or default inputs) that determine the horizontal angle of probing and a vertical dispersion angle of probing.

In one embodiment, one or more of virtual probe dimensions and virtual probe angle inputs are received that determine one or more of a conical probe space 405, vertical probe space 415, and horizontal probe space 425. When one or more virtual probe dimensions and virtual probe angle inputs are not received, the virtual probe is implemented utilizing one or more default virtual probe dimensions and default virtual probe angle inputs. The one or more default virtual probe dimensions include a predefined axial length, a predefined horizontal angle of probing, and a predefined vertical angle of probing.

Figure 5:
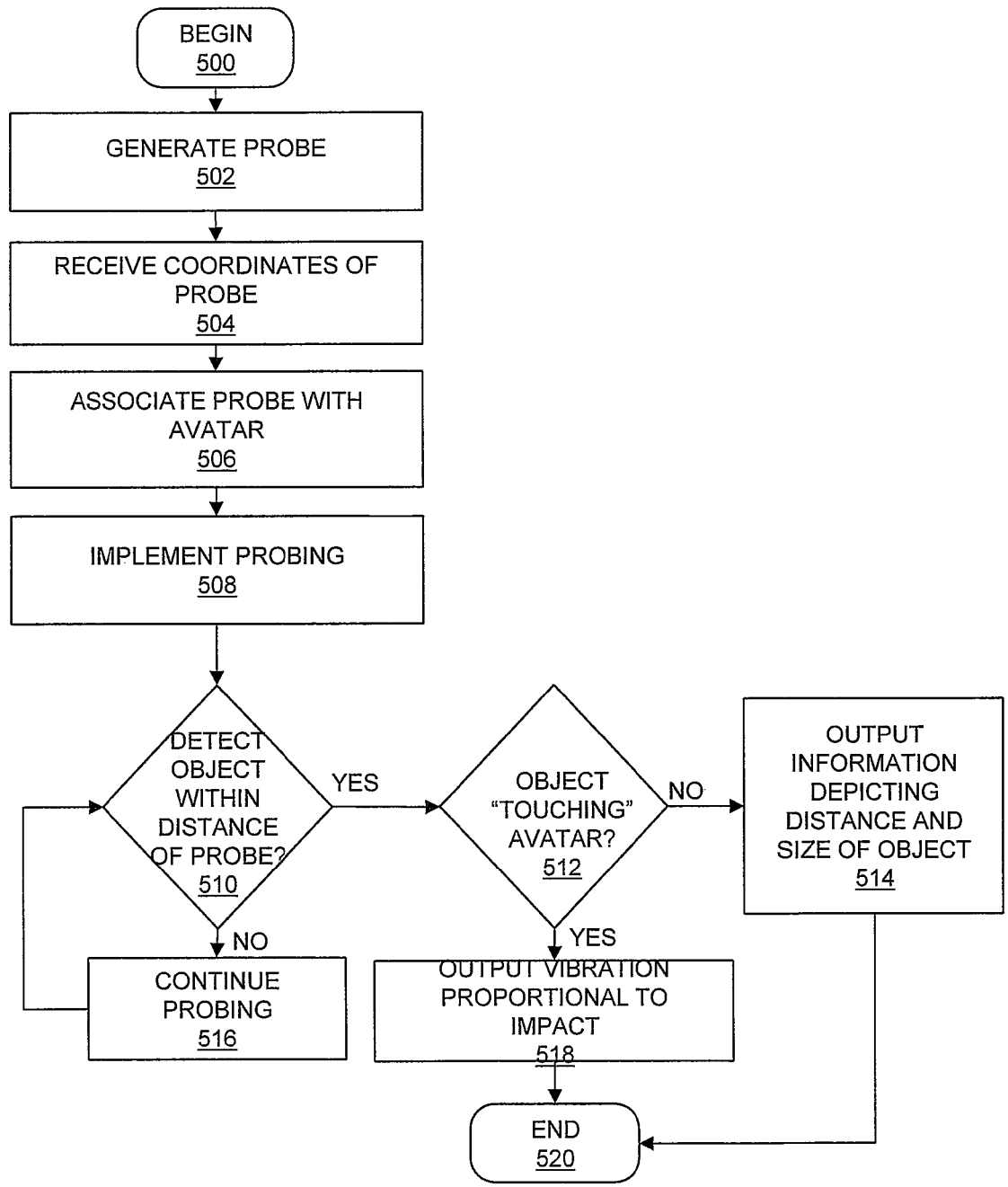
FIG. 5 is a flow chart illustrating the method by which the operations of the virtual probe result in tactile and audible output, according to one embodiment of the invention.

FIG. 5 is a flow chart illustrating a method by which the above processes of the illustrative embodiments are completed. Although the methods illustrated in FIG. 5 may be described with reference to components shown in FIGS. 1-4, it should be understood that this is merely for convenience and alternative components and/or configurations thereof can be employed when implementing the various methods. Key portions of the methods may be completed by VWP utility 140 executing on processor 105 within DPS 100 (FIG. 1) and controlling specific operations on DPS 100, and the methods are thus described from the perspective of both VWP utility 140 and DPS 100.

FIG. 5 depicts a process by which audible information and tactile information are received as a result of virtual probe operations. The process of FIG. 5 begins at initiator block 500 and proceeds to block 502, at which a virtual probe is generated. Coordinates (dimensions and virtual probe angle of operations) of the virtual probe are received at block 504. The coordinates determine a probing range for the virtual probe. At block 506 the virtual probe is associated with the avatar. Probing of the virtual world environment is implemented at block 508.

A decision is made, at block 510, whether an object is detected within the range of the probe. If an object is not detected by the virtual probe, the process continues to block 516. At block 516 the virtual probe continues probing and returns to block 510. If an object is detected within the range of the virtual probe, the process continues to block 512. A decision is made, at block 512, whether the object detected is touching the avatar. If the object is not touching the avatar the process continues to block 514. At block 514, tactile information and/or audible information are outputted depicting the distance and or size (dimensions) of the object. If the object is touching the avatar, the process continues to block 518. At block 518, tactile information, such as a vibration, is output to a tactile device (and/or audible device) proportional to the impact of the object and the avatar. The process ends at block 520.

In the flow charts above, one or more of the methods are embodied in a computer readable storage medium containing computer readable code such that a series of steps are performed when the computer readable code is executed (by a processing unit) on a computing device. In some implementations, certain processes of the methods are combined, performed simultaneously or in a different order, or perhaps omitted, without deviating from the spirit and scope of the invention. Thus, while the method processes are described and illustrated in a particular sequence, use of a specific sequence of processes is not meant to imply any limitations on the invention. Changes may be made with regards to the sequence of processes without departing from the spirit or scope of the present invention. Use of a particular sequence is therefore, not to be taken in a limiting sense, and the scope of the present invention extends to the appended claims and equivalents thereof.

As will be appreciated by one skilled in the art, the present invention may be embodied as a method, system, and/or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module," "logic", or "system." Furthermore, the present invention may take the form of a computer program product on a computer-usable storage medium having computer-usable program code embodied in or on the medium.

As will be further appreciated, the processes in embodiments of the present invention may be implemented using any combination of software, firmware, microcode, or hardware. As a preparatory step to practicing the invention in software, the programming code (whether software or firmware) will typically be stored in one or more machine readable storage mediums such as fixed (hard) drives, diskettes, magnetic disks, optical disks, magnetic tape, semiconductor memories such as RAMs, ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The medium may be electronic, magnetic, optical, electromagnetic, infrared, or semiconductor system (or apparatus or device) or a propagation medium. Further, the medium may be any apparatus that may contain, store, communicate, propagate, or transport the program for use by or in connection with the execution system, apparatus, or device. The methods of the invention may be practiced by combining one or more machine-readable storage devices containing the code according to the described embodiment(s) with appropriate processing hardware to execute the code contained therein. An apparatus for practicing the invention could be one or more processing devices and storage systems containing or having network access (via servers) to program(s) coded in accordance with the invention. In general, the term computer, computer system, or data processing system can be broadly defined to encompass any device having a processor (or processing unit) which executes instructions/code from a memory medium.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution. By way of example, a non exclusive list of types of media, includes recordable type (tangible) media such as floppy disks, thumb drives, hard disk drives, CD ROMs, DVDs, and transmission type media such as digital and analogue communication links.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method for enabling sightless navigation of an avatar through a virtual world, the method comprising:

providing a virtual probe that outputs one or more of tactile information and audible information depicting presence of an object by:

generating the virtual probe when a request is received to initiate use of the virtual probe, wherein the virtual probe detects an object in the virtual world;

receiving one or more virtual probe dimensions to determine a type of probe and a probing range for the virtual probe within the virtual world;

determining an axial length of the virtual probe when the one or more virtual probe dimensions are received;

receiving one or more virtual probe angle inputs that identify a horizontal angle of probing and a vertical dispersion angle of probing;

in response to not receiving one or more virtual probe dimensions, implementing the virtual probe with one or more default virtual probe dimensions, wherein the one or more default virtual probe dimensions include a predefined axial length;

in response to not receiving one or more virtual probe angle inputs, implementing the virtual probe with one or more default virtual probe angle inputs, wherein the one or more default virtual probe angle inputs include a predefined horizontal angle of probing, and a predefined vertical angle of probing;

associating the virtual probe with the avatar;

associating the movement of the virtual probe with the movement of the avatar, wherein when the avatar turns one of left, right, up, down, forward, or backward, the virtual probe scans an area determined by the axial length, horizontal dispersion angle, and vertical dispersion angle of the virtual probe relative to a current position of the avatar;

positioning the virtual probe to precede the avatar when the avatar is in motion;

in response to the virtual probe detecting the object within the path of the avatar, determining one or more of a distance between the object and the avatar, a relative location of the object, a velocity of the object, and a dimension of the object;

outputting one or more of the tactile information and the audible information when the virtual probe intersects the object;

associating the tactile information with one or more of the distance between the object and the avatar, the relative location of the object, the velocity of the object, and the dimensions of the object;

in response to the tactile information being a vibration, associating one or more of a frequency and an intensity of the vibration with the distance between the object and the avatar;

increasing one or more of the frequency and the intensity of the vibration as the distance between the object and the avatar decreases;

decreasing one or more of the frequency and the intensity of the vibration as the distance between the object and the avatar increases;

in response to the audible information being an audible voice, outputting one or more of the distance between the object and the avatar, the relative location of the object, the velocity of the object, and the dimensions of the object;

in response to the audible information being a tone, outputting a sound proportional to one or more of the distance between the object and the avatar and the dimensions of the object, wherein the tone is one or more of a single tone and a series of tones;

increasing one or more of a pitch, a tone frequency, and a frequency of tone outputs when the distance between the object and the avatar decreases;

decreasing one or more of the pitch, the tone frequency, and the frequency of tone outputs when the distance between the object and the avatar decreases; and associating one or more tactile devices with the virtual probe, wherein when the virtual probe encounters the object, the tactile device outputs one or more of the tactile information and audible information.

2. A data processing system comprising:

a processor;

a system memory coupled to said processor unit; and an virtual world probe utility within said memory, wherein said virtual world probe utility enables sightless navigation of an avatar through a virtual world, said virtual world probe utility further performing the functions of:

generating the virtual probe when a request is received to initiate use of the virtual probe, wherein the virtual probe detects an object in the virtual world;

receiving one or more virtual probe dimensions to determine a type of probe and a probing range for the virtual probe within the virtual world;

determining an axial length of the virtual probe when the one or more virtual probe dimensions are received;

receiving one or more virtual probe angle inputs that identify a horizontal angle of probing and a vertical dispersion angle of probing;

in response to not receiving one or more virtual probe dimensions, implementing the virtual probe with one or more default virtual probe dimensions, wherein the one or more default virtual probe dimensions include a predefined axial length;

in response to not receiving one or more virtual probe angle inputs, implementing the virtual probe with one or more default virtual probe angle inputs, wherein the one or more default virtual probe angle inputs include a predefined horizontal angle of probing, and a predefined vertical angle of probing;

associating the virtual probe with the avatar;

associating the movement of the virtual probe with the movement of the avatar, wherein when the avatar turns one of left, right, up, down, forward, or backward, the virtual probe scans an area determined by the axial length, horizontal dispersion angle, and vertical dispersion angle of the virtual probe relative to a current position of the avatar;

positioning the virtual probe to precede the avatar when the avatar is in motion;

in response to the virtual probe detecting the object within the path of the avatar, determining one or more of a distance between the object and the avatar, a relative location of the object, a velocity of the object, and a dimension of the object;

outputting one or more of the tactile information and the audible information when the virtual probe intersects the object;

associating the tactile information with one or more of the distance between the object and the avatar, the relative location of the object, the velocity of the object, and the dimensions of the object;

in response to the tactile information being a vibration, associating one or more of a frequency and an intensity of the vibration with the distance between the object and the avatar;

increasing one or more of the frequency and the intensity of the vibration as the distance between the object and the avatar decreases;

decreasing one or more of the frequency and the intensity of the vibration as the distance between the object and the avatar increases;

in response to the audible information being an audible voice, outputting one or more of the distance between the object and the avatar, the relative location of the object, the velocity of the object, and the dimensions of the object;

in response to the audible information being a tone, outputting a sound proportional to one or more of the distance between the object and the avatar and the dimensions of the object, wherein the tone is one or more of a single tone and a series of tones;

increasing one or more of a pitch, a tone frequency, and a frequency of tone outputs when the distance between the object and the avatar decreases;

decreasing one or more of the pitch, the tone frequency, and the frequency of tone outputs when the distance between the object and the avatar decreases; and associating one or more tactile devices with the virtual probe, wherein when the virtual probe encounters the object, the tactile device outputs one or more of the tactile information and audible information.

3. A computer program product comprising:

a non-transitory computer readable storage medium; and program code on said computer readable storage medium that that when executed provides the functions of:

providing a virtual probe that outputs one or more of tactile information and audible information depicting presence of an object by:

generating the virtual probe when a request is received to initiate use of the virtual probe, wherein the virtual probe detects an object in the virtual world;

receiving one or more virtual probe dimensions to determine a type of probe and a probing range for the virtual probe within the virtual world;

determining an axial length of the virtual probe when the one or more virtual probe dimensions are received;

receiving one or more virtual probe angle inputs that identify a horizontal angle of probing and a vertical dispersion angle of probing;

in response to not receiving one or more virtual probe dimensions, implementing the virtual probe with one or more default virtual probe dimensions, wherein the one or more default virtual probe dimensions include a predefined axial length;

in response to not receiving one or more virtual probe angle inputs, implementing the virtual probe with one or more default virtual probe angle inputs, wherein the one or more default virtual probe angle inputs include a predefined horizontal angle of probing, and a predefined vertical angle of probing;

associating the virtual probe with the avatar;

associating the movement of the virtual probe with the movement of the avatar, wherein when the avatar turns one of left, right, up, down, forward, or backward, the virtual probe scans an area determined by the axial length, horizontal dispersion angle, and vertical dispersion angle of the virtual probe relative to a current position of the avatar;

positioning the virtual probe to precede the avatar when the avatar is in motion;

in response to the virtual probe detecting the object within the path of the avatar, determining one or more of a distance between the object and the avatar, a relative location of the object, a velocity of the object, and a dimension of the object;

outputting one or more of the tactile information and the audible information when the virtual probe intersects the object;

associating the tactile information with one or more of the distance between the object and the avatar, the relative location of the object, the velocity of the object, and the dimensions of the object;

in response to the tactile information being a vibration, associating one or more of a frequency and an intensity of the vibration with the distance between the object and the avatar;

increasing one or more of the frequency and the intensity of the vibration as the distance between the object and the avatar decreases;

decreasing one or more of the frequency and the intensity of the vibration as the distance between the object and the avatar increases;

in response to the audible information being an audible voice, outputting one or more of the distance between the object and the avatar, the relative location of the object, the velocity of the object, and the dimensions of the object;

in response to the audible information being a tone, outputting a sound proportional to one or more of the distance between the object and the avatar and the dimensions of the object, wherein the tone is one or more of a single tone and a series of tones;

increasing one or more of a pitch, a tone frequency, and a frequency of tone outputs when the distance between the object and the avatar decreases;

decreasing one or more of the pitch, the tone frequency, and the frequency of tone outputs when the distance between the object and the avatar decreases; and associating one or more tactile devices with the virtual probe, wherein when the virtual probe encounters the object, the tactile device outputs one or more of the tactile information and audible information.

* * * * *